US012803669B2

(12) United States Patent
Nakano

(10) Patent No.: US 12,803,669 B2
(45) Date of Patent: Nov. 17, 2026

(54) OPTICAL MODULATOR AND OPTICAL MODULATION METHOD

(71) Applicant: NEC Corporation, Tokyo (JP)

(72) Inventor: Masayuki Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 237 days.

(21) Appl. No.: 18/698,395

(22) PCT Filed: Nov. 11, 2021

(86) PCT No.: PCT/JP2021/041582

§ 371 (c)(1), (2) Date: Apr. 4, 2024

(87) PCT Pub. No.: WO2023/084708

PCT Pub. Date: May 19, 2023

(65) Prior Publication Data

US 2024/0333391 A1 Oct. 3, 2024

(51) Int. Cl.

*H04B 10/2507* (2013.01)
*H04B 10/50* (2013.01)
*H04B 10/548* (2013.01)
*H04B 10/60* (2013.01)

(52) U.S. Cl.

CPC ..... *H04B 10/2507* (2013.01); *H04B 10/5053* (2013.01); *H04B 10/548* (2013.01); *H04B 10/60* (2013.01)

(58) Field of Classification Search

CPC ........................ H04B 10/2507; H04B 10/5053
USPC .......................................................... 398/159
See application file for complete search history.

(56) References Cited

U.S. PATENT DOCUMENTS

| | | | | |
|---|---|---|---|---|
| 5,524,076 | A | 6/1996 | Rolland et al. | |
| 9,485,028 | B2 * | 11/2016 | Magri et al. | G02F 1/0123 |
| 12,216,377 | B2 * | 2/2025 | Tsai et al. | G02F 1/225 |
| 2005/0180682 | A1 * | 8/2005 | Griffin | G02B 6/26 385/16 |

(Continued)

FOREIGN PATENT DOCUMENTS

| | | | |
|---|---|---|---|
| JP | 2008-009314 | A | 1/2008 |
| JP | 2012-519873 | A | 8/2012 |

(Continued)

OTHER PUBLICATIONS

International Search Report for PCT Application No. PCT/JP2021/041582, mailed on Jan. 11, 2022.

(Continued)

*Primary Examiner* — Kenneth N Vanderpuye

(57) ABSTRACT

In order to apply pre-chirping to an optical modulation signal by a simple configuration, an optical modulator includes: an optical splitter that splits input light into two light beams; a first arm and a second arm that modulate the two light beams split by the optical splitter, respectively, by transmission data; and an optical coupler that couples output light of the first arm and output light of the second arm at a predetermined coupling ratio to generate an optical modulation signal, and the optical splitter, the first and second arms and the optical coupler are configured so as to operate as a Mach-Zehnder optical modulator, and the coupling ratio of the optical coupler is set such that predetermined pre-chirping is applied to the optical modulation signal.

5 Claims, 18 Drawing Sheets

(56) References Cited

U.S. PATENT DOCUMENTS

| | | | | |
|---|---|---|---|---|
| 2013/0022306 | A1* | 1/2013 | Tipper et al. | G02F 1/035<br>385/3 |
| 2013/0322809 | A1* | 12/2013 | Goh et al. | G02F 1/0115<br>385/3 |
| 2017/0293165 | A1* | 10/2017 | Kaneoka et al. | G02F 1/0123 |

FOREIGN PATENT DOCUMENTS

| | | | |
|---|---|---|---|
| JP | 2014-219571 | A | 11/2014 |
| JP | 2015-530612 | A | 10/2015 |
| WO | 2006/100719 | A1 | 9/2006 |
| WO | 2020/178559 | A1 | 9/2020 |

OTHER PUBLICATIONS

English translation of Written opinion for PCT Application No. PCT/JP2021/041582, mailed on Jan. 11, 2022.

Pal, Subhradeep et al. Junction-less optical phase shifter loaded silicon Mach-Zehnder modulator. Optics Communications. Apr. 15, 2019, vol. 437, pp. 110-120.

Petousi, Despoina et al. Performance Limits of Depletion-Type Silicon Mach-Zehnder Modulators for Telecom Applications. Journal of Lightwave Technology. Nov. 15, 2013, vol. 31, No. 22, pp. 3556-3562.

Japanese Office Action for JP Application No. 2023-559319 mailed on Jan. 7, 2025 with English Translation.

* cited by examiner

COUPLING RATIO 0.5:0.5
PHASE RATIO 0.5:0.5

COUPLING RATIO 0.5:0.5
PHASE RATIO 0.5:0.5

COUPLING RATIO 0.5:0.5
PHASE RATIO 0.5:0.5

COUPLING RATIO 0.5:0.5
PHASE RATIO 0.5:0.5

OPTICAL MODULATOR AND OPTICAL MODULATION METHOD

This application is a National Stage Entry of PCT/JP2021/041582 filed on Nov. 11, 2021, the contents of all of which are incorporated herein by reference, in their entirety.

TECHNICAL FIELD

The present invention relates to an optical modulator and an optical modulation method.

BACKGROUND ART

An optical modulator of an optical waveguide type is capable of performing high-speed modulation, and hence has been widely used in an optical transmitter in a high-capacity optical transmission system. As the optical modulator of an optical waveguide type, a Mach-Zehnder optical modulator (hereinafter, referred to as a "MZ optical modulator") has been known. FIG. 24 is a diagram illustrating a configuration of a general MZ optical modulator. An MZ optical modulator 900 includes an arm 911, an arm 912, an optical splitter 921, and an optical coupler 922. The optical splitter 921 splits input continuous light into the arm 911 and the arm 912 at a power ratio of 0.5:0.5. The arms 911 and 912 each include an electrode, and a phase of the continuous light is modulated by applying a voltage to each electrode. The optical coupler 922 couples an output from the arm 911 and an output from the arm 912 at a power ratio of 0.5:0.5. As a material of the MZ optical modulator, a semiconductor formed of lithium niobate (hereinafter, referred to as "LN"), silicon, and the like is known.

Meanwhile, in an optical transmission system, a wavelength change called pre-chirping may be applied to an optical modulator in advance in order to suppress degradation of a waveform of an optical signal, which is caused by dispersion of an optical fiber being an optical transmission path. A phase difference can be introduced to light propagating through two arms of the MZ optical modulator by controlling a voltage applied to the two arms. This can be utilized for applying pre-chirping to modulated light. An influence of dispersion of the optical transmission path is suppressed by pre-chirping, and hence quality degradation of an optical signal received by an optical receiver is suppressed.

In relation to the present invention, PTLs 1 to 3 describe a technique of controlling chirping in an optical modulator.

CITATION LIST

Patent Literature

PTL 1: Japanese Unexamined Patent Application Publication No. 2008-009314

PTL 2: International Patent Publication No. WO2006/100719

PTL 3: Published Japanese Translation of PCT International Publication for Patent Application, No. 2012-519873

SUMMARY OF INVENTION

Technical Problem

As described above, a modulator using lithium niobate (hereinafter, referred to as an "LN modulator") has been widely used as an optical modulator. However, in general, the LN modulator requires a length on an order of centimeters in order to enhance modulation efficiency, and hence there is a problem that it is difficult to reduce a size of an optical transmitter in response to a demand for reducing a size of a device to be used in an optical communication system.

Thus, for reduction in size of an optical transmitter, a Mach-Zender (MZ) optical modulator using a semiconductor formed of silicon or the like (hereinafter, referred to as a "silicon optical modulator") may be used as an optical modulator in place of the LN modulator. The size of the silicon optical modulator is on an order of millimeters, and is smaller than that of the LN modulator. Thus, reduction in size of an optical transmitter can be achieved by using the silicon optical modulator in place of the LN modulator.

However, as compared to the LN modulator, the silicon optical modulator has a characteristic of exhibiting a less phase change of modulated light in response to a change of a voltage applied to an electrode of an arm. Therefore, when pre-chirping is similarly applied to light being input to the silicon optical modulator, a higher voltage needs to be applied to the electrode of the arm in the silicon optical modulator, as compared to the LN modulator. Thus, an electric circuit for applying pre-chirping is large scale, control of an applied voltage is complex, and hence there is a problem that a configuration of the silicon optical modulator is complex.

OBJECT OF INVENTION

An object of the present invention is to provide a technique of providing an optical modulator capable of applying pre-chirping to an optical modulation signal with a simple configuration.

Solution to Problem

An optical modulator according to the present invention includes an optical splitting means for splitting input light into two light beams; a first arm and a second arm that respectively modulate the two light beams by transmission data after split by the optical splitting means; and an optical coupling means for coupling output light from the first arm and output light from the second arm at a predetermined coupling ratio and generating an optical modulation signal, wherein the optical splitting means, the first and the second arms, and the optical coupling means are configured to operate as a Mach-Zehnder optical modulator, and the coupling ratio is set in such a way as to apply predetermined pre-chirping to the optical modulation signal.

An optical modulation method according to the present invention includes procedures of: configuring a Mach-Zehnder optical modulator by splitting input light into two light beams, modulating, with a first arm and a second arm respectively, the two light beams after split, and coupling output light from the first arm and output light from the second arm at a predetermined coupling ratio and generating an optical modulation signal; and setting the coupling ratio in such a way as to apply predetermined pre-chirping to the optical modulation signal.

Advantageous Effects of Invention

The present invention has an effect of being able to apply pre-chirping to an optical modulation signal with a simple configuration.

EXAMPLE EMBODIMENT

Figure 1:
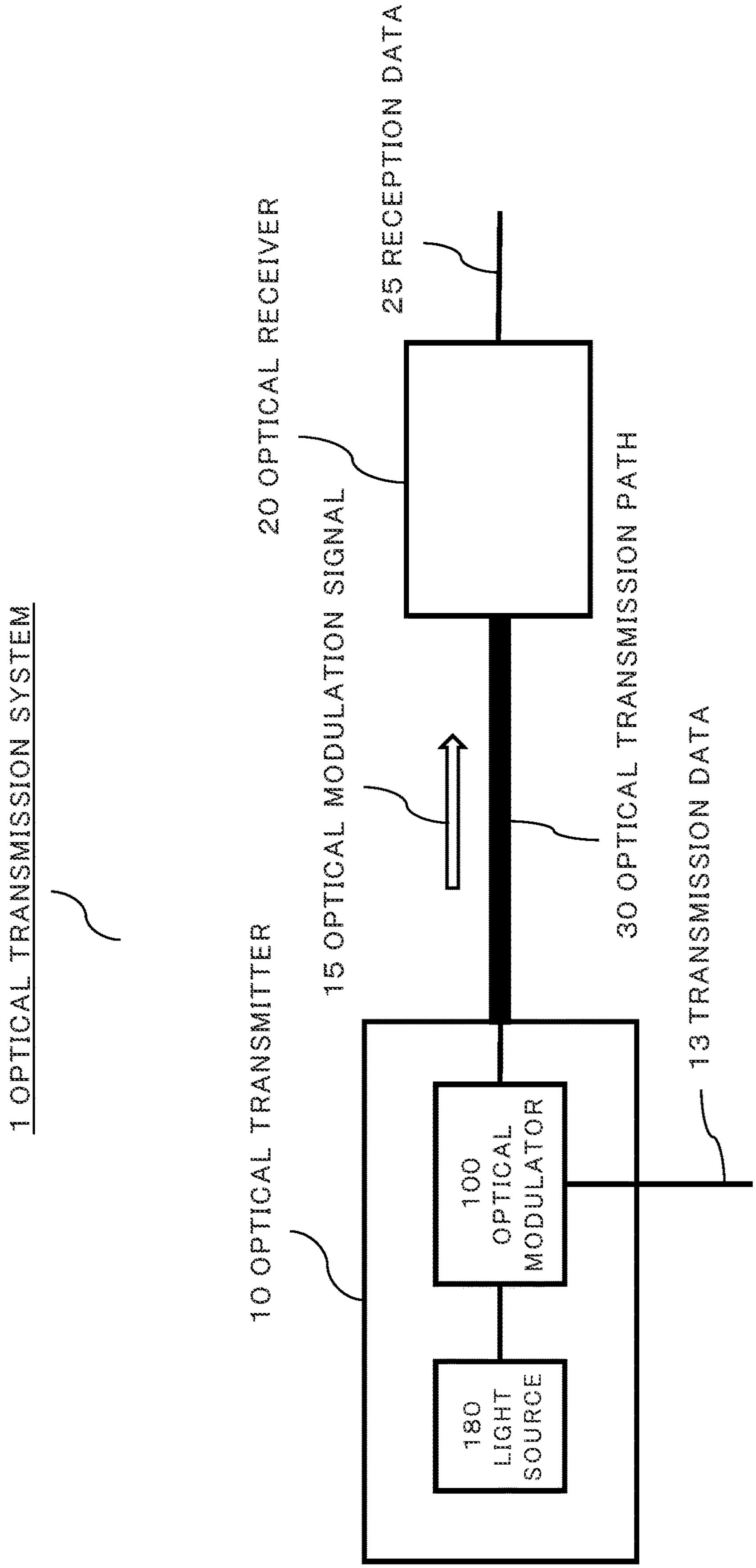
FIG. 1 is a block diagram illustrating a configuration example of an optical transmission system 1 according to a first example embodiment.

With reference to the drawings, example embodiments of the present invention are described. In the drawings in the following description, equivalent constituent elements are denoted with the same reference symbols, and description therefor is omitted as appropriate. Further, arrows in the drawings are merely examples, and are not intended to limit directions of signals or the like.

First Example Embodiment

FIG. 1 is a block diagram illustrating a configuration example of an optical transmission system 1 according to a first example embodiment of the present invention. The optical transmission system 1 includes an optical transmitter 10, an optical receiver 20, and an optical transmission path 30. The optical transmitter 10 includes a light source 180 and an optical modulator 100. The light source 180 is an optical oscillator. The light source 180 generates continuous light, and outputs the continuous light to the optical modulator 100. For example, the light source 180 is a laser diode that emits light in a band of 1,300 nm or a band of 1,550 nm. The optical modulator 100 modulates the continuous light that is input from the light source 180, by using transmission data 13, and outputs the modulated light (optical modulation signal 15) to the optical transmission path 30. The transmission data is data transmitted from the optical transmitter 10 to the optical receiver 20 in the optical transmission system 1. The optical receiver 20 receives the optical modulation signal 15 from the optical transmission path 30, and outputs the demodulated transmission data 13 as reception data 25.

The optical transmission path 30 is an optical fiber. Thus, a waveform of the optical modulation signal 15 propagating through the optical transmission path 30 is degraded due to dispersion of the optical transmission path 30. Degradation of the waveform of the optical modulation signal 15 causes degradation of transmission quality such as degradation of reception sensitivity in the optical receiver 20 and an increase in the error rate of the demodulated reception data 25. In order to prevent such degradation of transmission quality, the optical modulator 100 applies pre-chirping to the optical modulation signal 15 at the time of modulation using the transmission data 13. The pre-chirping suppresses degradation of transmission quality due to dispersion of the optical transmission path 30.

Figure 2:
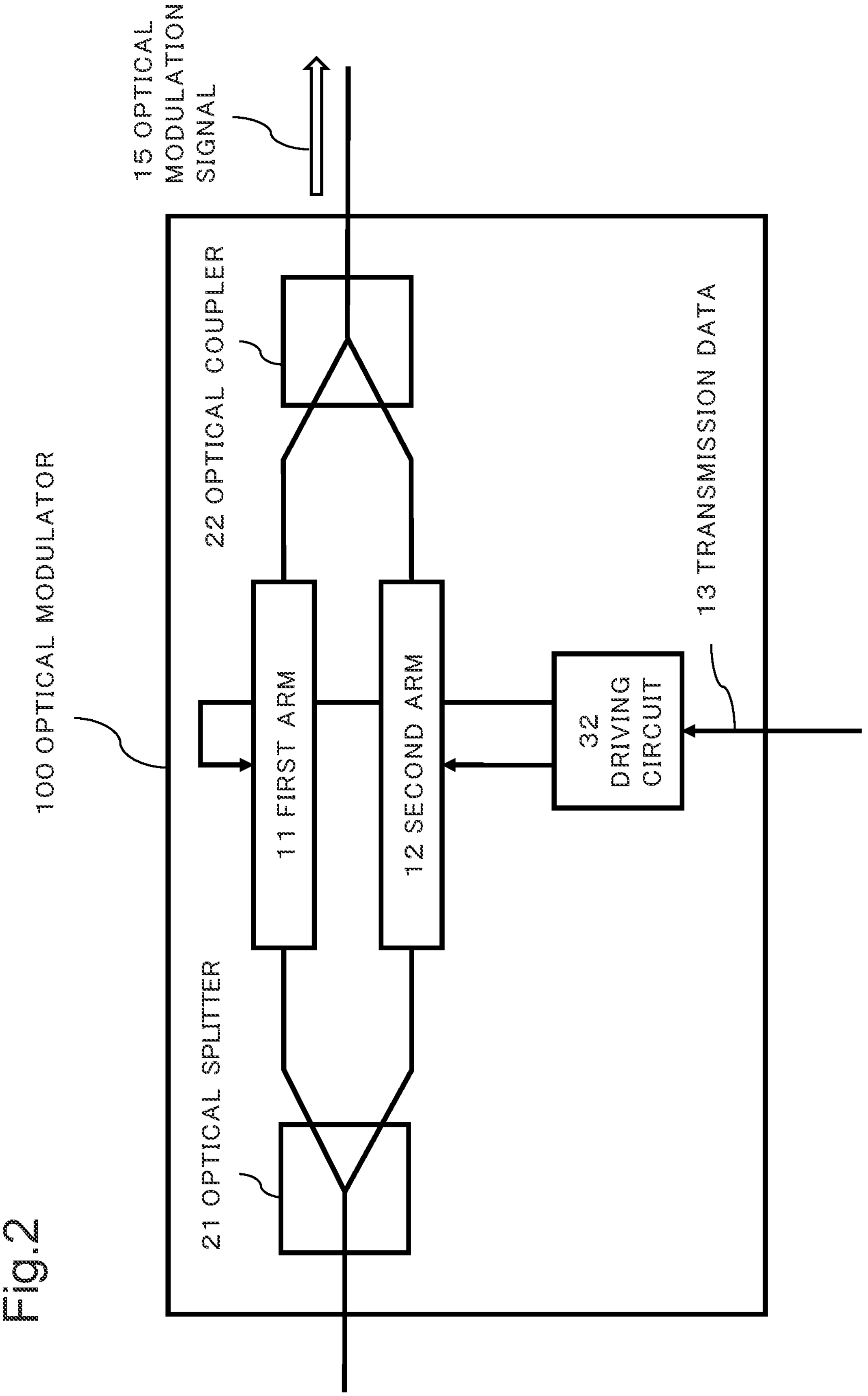
FIG. 2 is a block diagram illustrating a configuration example of an optical modulator.
Figure 3:
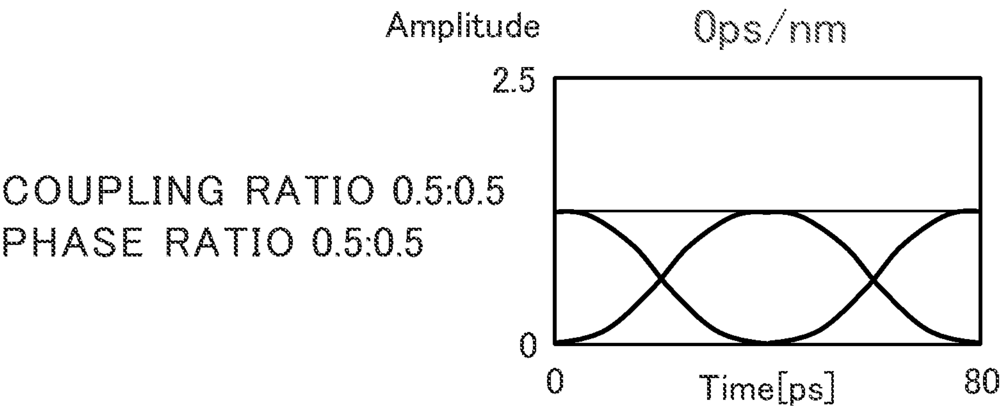
FIG. 3 is a diagram illustrating an example of a simulation result of a waveform of reception data when pre-chirping is not applied.
Figure 4:
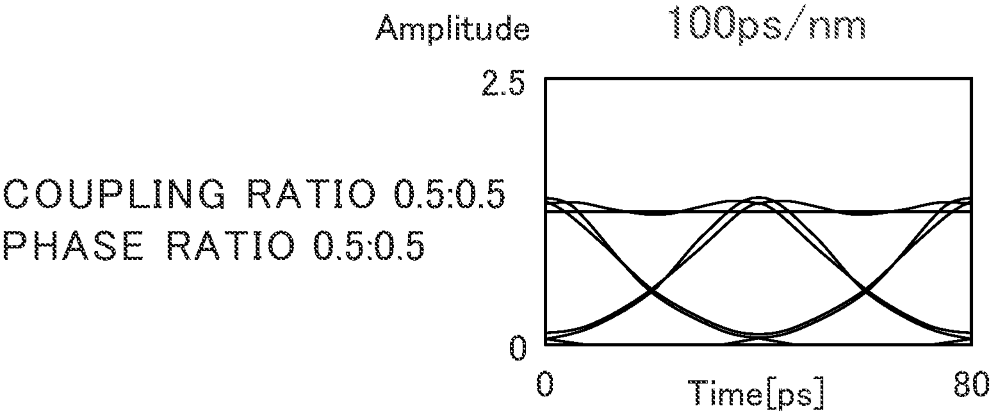
FIG. 4 is a diagram illustrating an example of a simulation result of a waveform of reception data when pre-chirping is not applied.
Figure 5:
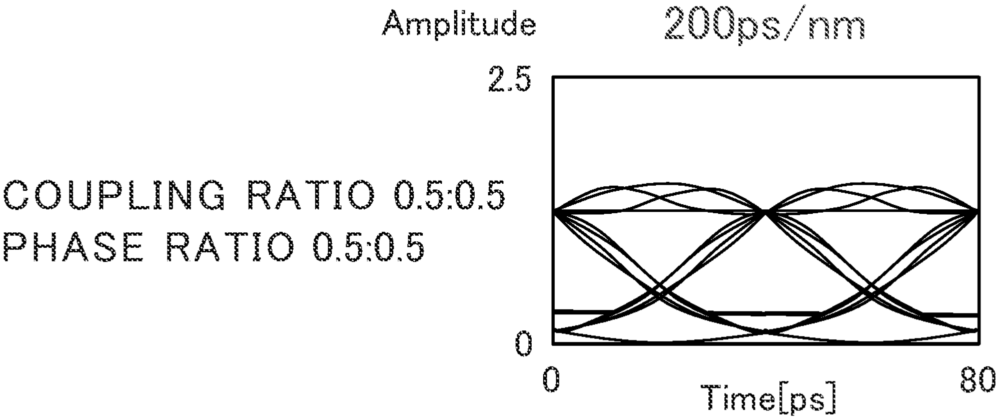
FIG. 5 is a diagram illustrating an example of a simulation result of a waveform of reception data when pre-chirping is not applied.
Figure 6:
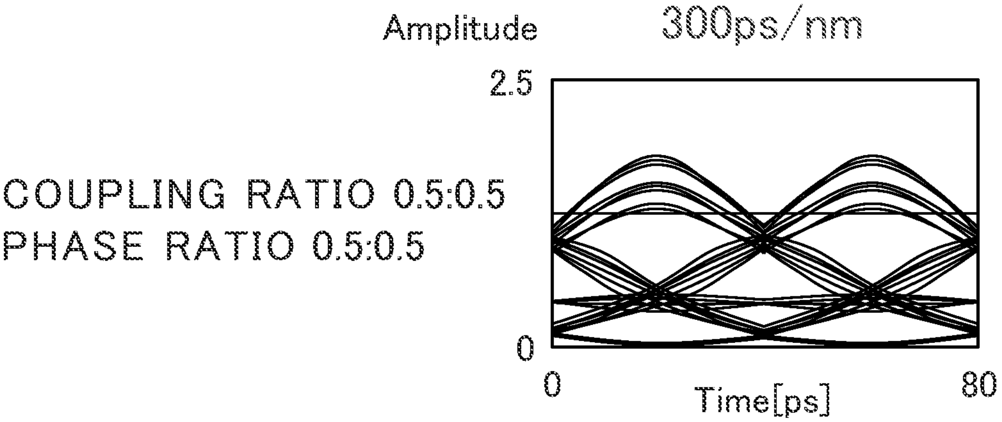
FIG. 6 is a diagram illustrating an example of a simulation result of a waveform of reception data when pre-chirping is not applied.
Figure 7:
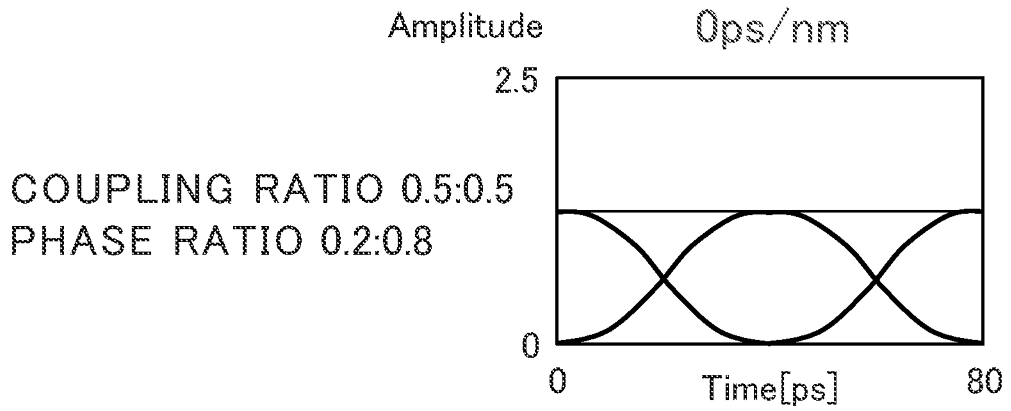
FIG. 7 is a diagram illustrating an example of a simulation result of a waveform of reception data when pre-chirping is applied by a general procedure.
Figure 8:
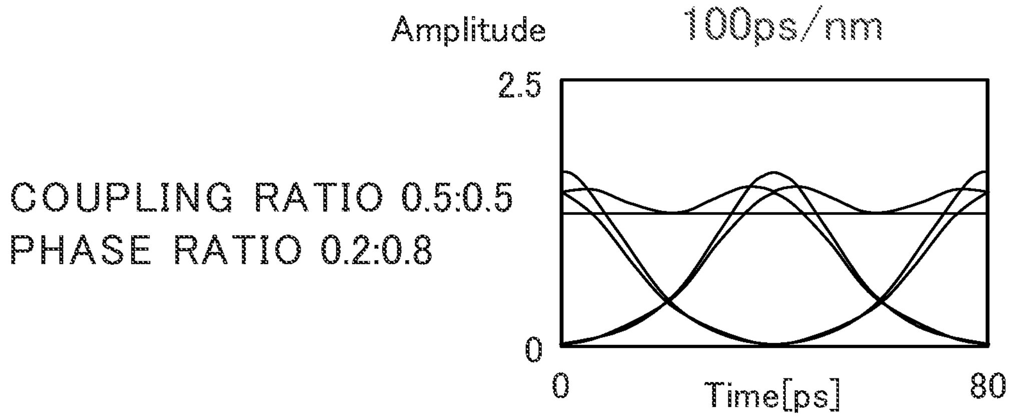
FIG. 8 is a diagram illustrating an example of a simulation result of a waveform of reception data when pre-chirping is applied by a general procedure.
Figure 9:
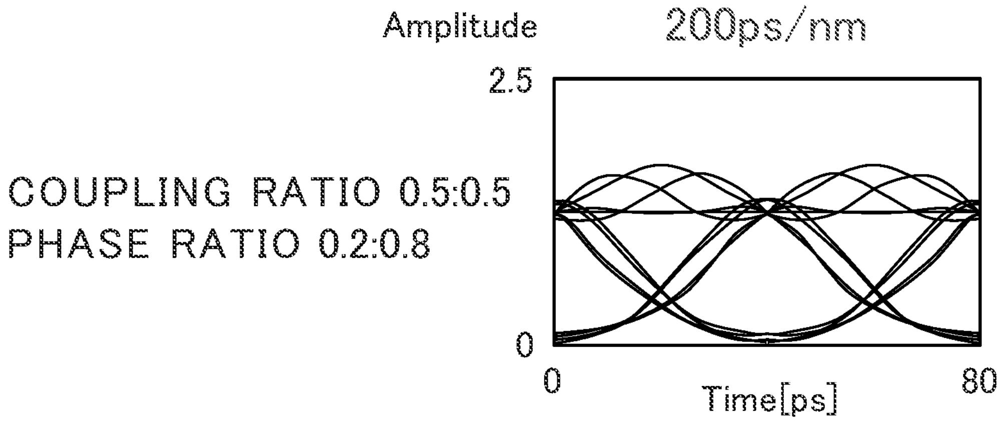
FIG. 9 is a diagram illustrating an example of a simulation result of a waveform of reception data when pre-chirping is applied by a general procedure.
Figure 10:
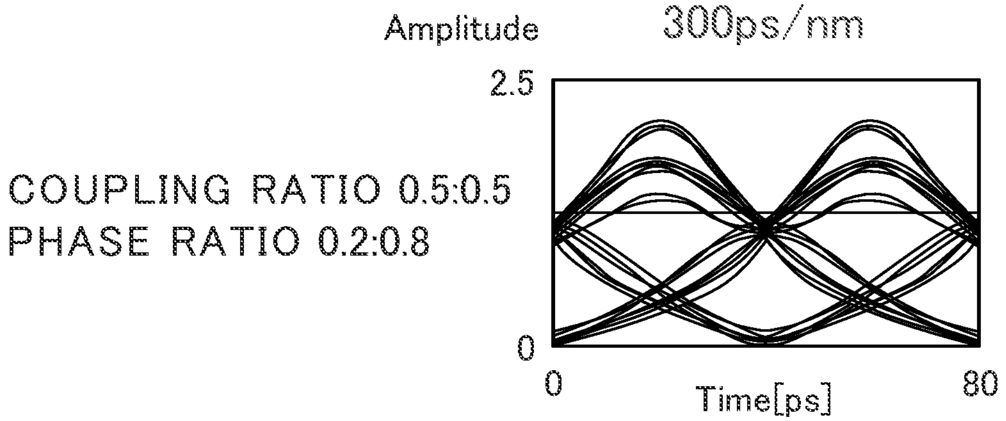
FIG. 10 is a diagram illustrating an example of a simulation result of a waveform of reception data when pre-chirping is applied by a general procedure.
Figure 11:
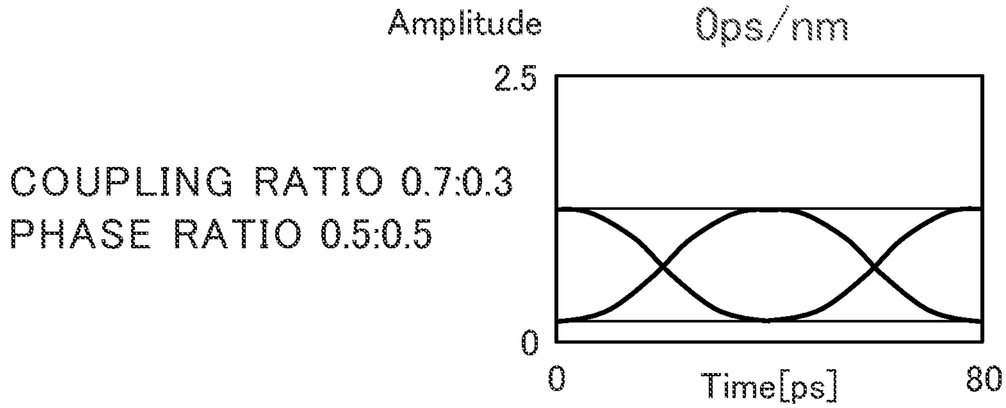
FIG. 11 is a diagram illustrating an example of a simulation result of a waveform of reception data when pre-chirping is applied by a procedure of changing a coupling ratio.
Figure 12:
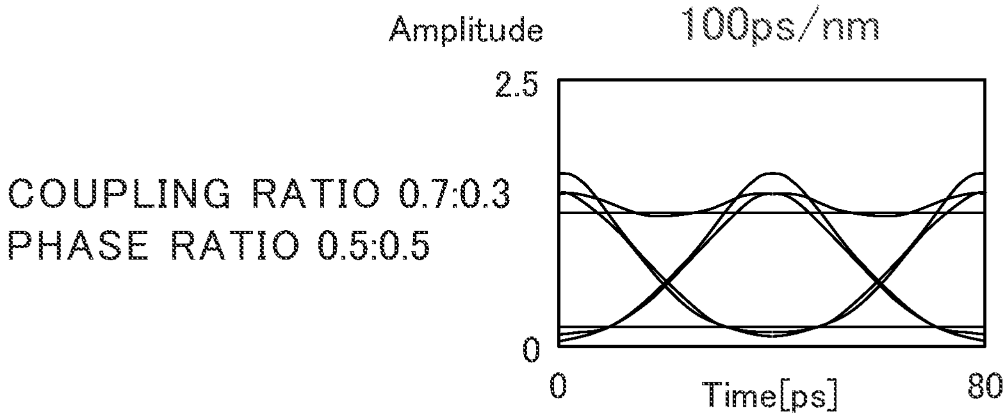
FIG. 12 is a diagram illustrating an example of a simulation result of a waveform of reception data when pre-chirping is applied by a procedure of changing a coupling ratio.
Figure 13:
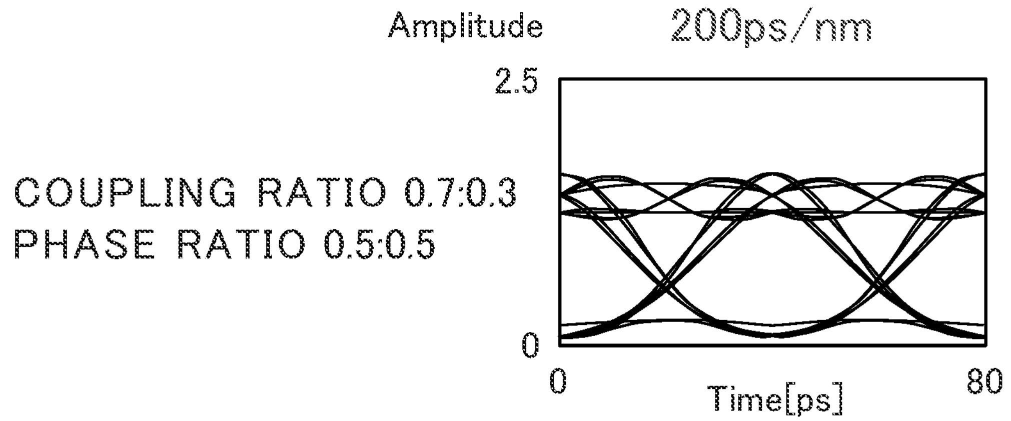
FIG. 13 is a diagram illustrating an example of a simulation result of a waveform of reception data when pre-chirping is applied by a procedure of changing a coupling ratio.
Figure 14:
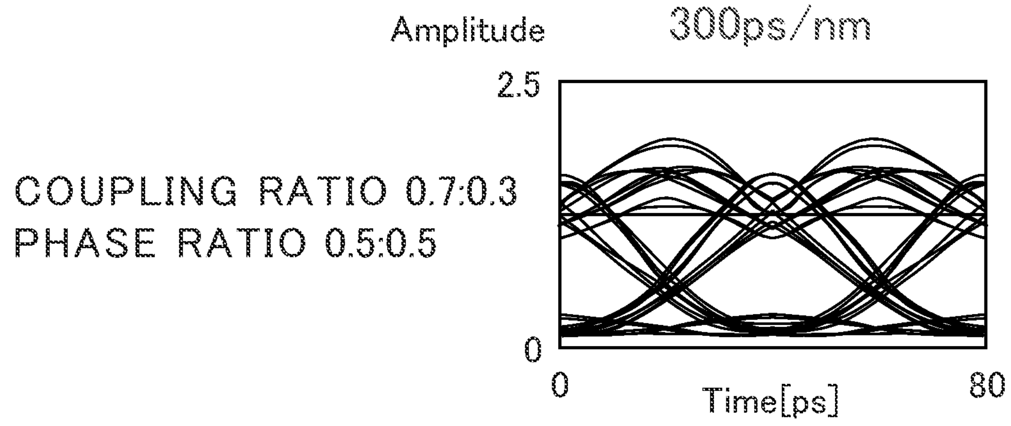
FIG. 14 is a diagram illustrating an example of a simulation result of a waveform of reception data when pre-chirping is applied by a procedure of changing a coupling ratio.

FIG. 2 is a block diagram illustrating a configuration example of the optical modulator 100. The optical modulator 100 includes a first arm 11, a second arm 12, an optical splitter 21, and an optical coupler 22. The optical modulator 100 is a MZ optical modulator. The optical modulator 100 is a silicon optical modulator consisting of an optical waveguide path formed of silicon as a material. However, the material of the optical modulator 100 is not limited to silicon. A driving circuit 32 is an interface circuit by applying the first and second arms to the transmission data 13 to modulate the continuous light. The driving circuit 32 is not essential in the configuration of the optical modulator 100, and the driving circuit 32 may be included inside the optical transmitter 10.

The optical splitter 21 splits the continuous light that is input from the light source 180 into two light beams, and outputs the two light beams to the first arm 11 and the second arm 12. In other words, the optical splitter 21 is an optical directional coupler with one input and two outputs, and a splitting ratio of the optical splitter 21 is, for example, 0.5:0.5. The splitting ratio of 0.5:0.5 indicates that a power ratio of the two light beams is 0.5:0.5 (in other words, the two light beams have equivalent power). However, the splitting ratio of the optical splitter 21 does not have to be exactly 0.5:0.5.

The first arm 11 and the second arm 12 modulates the continuous light by the transmission data 13 after split by the optical splitter 21. In a MZ optical modulator including two arms, a configuration of modulating continuous light by transmission data has been known well. Thus, detailed description relating to the MZ optical modulator is omitted. The light modulated by the first arm 11 and the light modulated by the second arm 12 are output to the optical coupler 22.

The optical coupler 22 is an optical directional coupler with two inputs and one output. The optical coupler 22 couples and outputs the light input from the first arm 11 and the light input from the second arm 12. A coupling ratio of the optical coupler 22 is set to a ratio other than 0.5:0.5, which is different from the general MZ optical modulator. Herein, when the coupling ratio of the optical coupler 22 is 0.5:0.5, it is indicated that, with regard to coupling at the optical coupler 22, the power of the light input from the first arm 11 and the power of the light input from the second arm 12 are equivalent to each other. Further, in the present example embodiment, for example, when the coupling ratio of the optical coupler 22 is 0.7:0.3, it is indicated that a ratio of power P11 of the light input from the first arm 11 and power P12 of the light input from the second arm 12 is 0.7:0.3. In other words, in this case, P11/P12=7/3 is satisfied.

As a means for applying the pre-chirping to the optical modulation signal 15, a procedure of controlling a applied voltage to an electrode of each of the first and second arms 11 and 12 and applying a phase difference between the light propagating through the first arm 11 and the light propagating through the second arm 12 (hereinafter, referred to as a "general procedure") has been known. In contrast, in the present example embodiment, a procedure different from the general procedure (hereinafter, referred to as a "procedure of changing a coupling ratio") is used. In the procedure of changing a coupling ratio, the pre-chirping is applied to the optical modulation signal 15 by setting the coupling ratio of the optical coupler 22 to a value other than 0.5:0.5.

With reference to FIG. 3 to FIG. 14, description is made on simulation results of the waveform of the optical modulation signal 15 at given dispersion when conditions for applying the pre-chirping are changed in the optical modulator 100. For description of a general technique, the coupling ratio of the optical coupler 22 is 0.5:0.5 in the simulations in FIG. 3 to FIG. 10. In FIG. 11 to FIG. 14, the coupling ratio of the optical coupler 22 is 0.7:0.3.

A "phase ratio" described in FIG. 3 to FIG. 14 is a ratio of a phase difference given to optical signals at the first arm 11 and the second arm 12. When the pre-chirping is not applied to the optical modulation signal 15, and when the pre-chirping is applied by the procedure of changing a coupling ratio, the phase difference for the pre-chirping is not applied to the two arms. Thus, in FIG. 3 to FIG. 6 and FIG. 11 to FIG. 14, the phase ratio is 0.5:0.5. Further, when the pre-chirping is applied by the general procedure (FIG. 7 to FIG. 10), the phase ratio is 0.2:0.8.

FIG. 3 to FIG. 6 are examples of the simulation results of the waveform of the reception data 25 when the pre-chirping is not applied to the optical modulation signal 15 in the optical modulator 100. In other words, in FIG. 3 to FIG. 6, control of the phase difference for applying the pre-chirping to the optical modulation signal 15 is not performed at the first arm 11 and the second arm 12. Further, the coupling ratio of the optical coupler 22 is 0.5:0.5. FIG. 3 to FIG. 6 illustrate examples of an eye pattern of the reception data 25 demodulated from the optical modulation signal 15 when dispersion is applied to the optical modulation signal 15 at 0 picoseconds per nanometer (ps/nm), 100 ps/nm, 200 ps/nm, and 300 ps/nm, respectively. When a general single-mode fiber is used to transmit an optical signal of 1,550 nm, dispersion at 100 ps/nm is associated with a transmission distance of approximately 5 km. It is indicated that an opening of the eye is smaller as dispersion increases. In particular, in FIG. 6, the opening of the eye is extremely small, which indicates a risk that transmission quality of the optical modulation signal 15 at the time of reception is significantly degraded as compared to a case with smaller dispersion.

FIG. 7 to FIG. 10 are diagrams illustrating examples of simulation results of the waveform of the reception data 25 when the pre-chirping is applied by the general procedure. In FIG. 7 to FIG. 10, the pre-chirping is applied to the optical modulation signal 15 by applying the phase difference between the light beams propagating through the first arm 11 and the second arm 12. FIG. 7 to FIG. 10 illustrate examples of an eye pattern of transmission data when dispersion is applied to the optical modulation signal 15 at 0 ps/nm, 100 ps/nm, 200 ps/nm, and 300 ps/nm, respectively. It is indicated that an opening of the eye is smaller as dispersion increases. However, the pre-chirping is applied to the optical modulation signal 15, and hence, for example, the opening of the eye in FIG. 10 in which dispersion is at 300 ps/nm is larger as compared to FIG. 6. This indicates that the pre-chirping improves transmission quality of the optical modulation signal 15.

FIG. 11 to FIG. 14 are diagrams illustrating simulation results of the waveform of the reception data 25 when the pre-chirping is applied by the procedure of changing a coupling ratio. In other words, in the optical modulator 100, control for applying the pre-chirping is not performed at the first arm 11 and the second arm 12. However, the pre-chirping is applied to the optical modulation signal 15 by setting the coupling ratio of the optical coupler 22 to a value other than 0.5:0.5. FIG. 11 to FIG. 14 illustrate examples in which the coupling ratio of the optical coupler 22 is 0.7:0.3. Further, FIG. 11 to FIG. 14 illustrate examples of an eye pattern of the transmission data when dispersion is applied to the optical modulation signal 15 at 0 ps/nm, 100 ps/nm, 200 ps/nm, and 300 ps/nm, respectively. Similarly to FIG. 3 to FIG. 10, it is indicated that an opening of the eye is smaller as dispersion increases. However, according to the simulation results of performing the procedure of changing a coupling ratio, for example, the openings of the eyes in FIG. 13 (dispersion at 200 ps/nm) and FIG. 14 (dispersion at 300 ps/nm) are equivalent to or larger than those in FIG. 9 and FIG. 10 in which the general procedure is performed. This indicates that, even when the pre-chirping is applied to the optical modulation signal 15 by the procedure of changing a coupling ratio, the optical modulation signal 15 can be provided with transmission quality equal to or better than that in a case in which the pre-chirping is applied by the general procedure. When the coupling ratio is changed from 0.6:0.4 to 0.9:0.1, transmission quality is also improved by the procedure of changing a coupling ratio.

Figure 15:
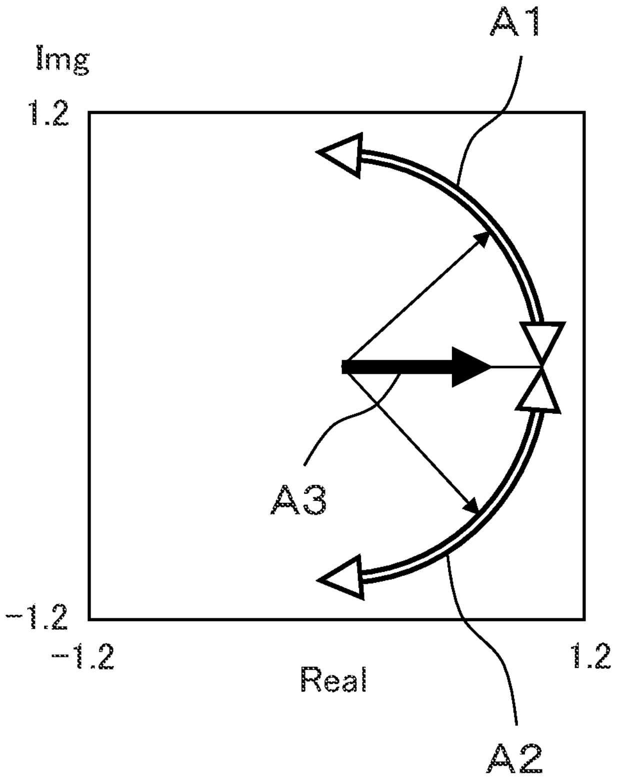
FIG. 15 is a diagram illustrating a relationship between an amplitude of a complex electric field of an optical signal and pre-chirping.
Figure 16:
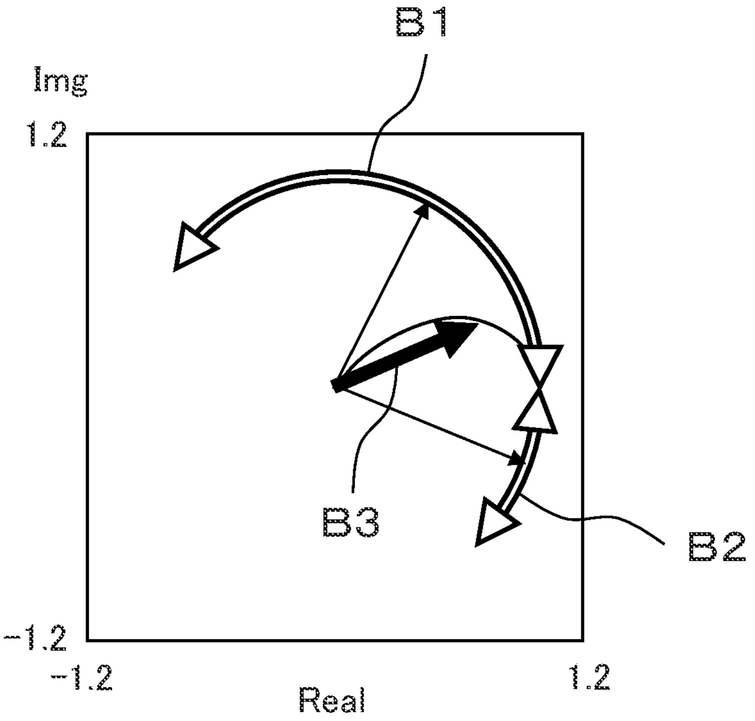
FIG. 16 is a diagram illustrating a relationship between an amplitude of a complex electric field of an optical signal and pre-chirping.
Figure 17:
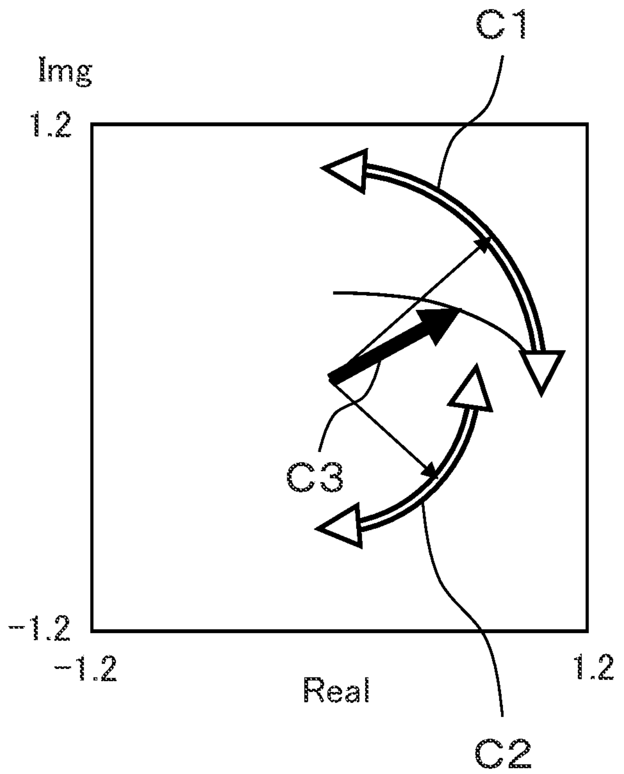
FIG. 17 is a diagram illustrating a relationship between an amplitude of a complex electric field of an optical signal and pre-chirping.

FIG. 15 to FIG. 17 are diagrams illustrating a relationship between an amplitude of a complex electric field of an optical signal and pre-chirping in the optical coupler 22. In each of FIG. 15 to FIG. 17, the horizontal axis indicates a real number axis of the complex electric field of the optical signal, and the vertical axis indicates an imaginary number axis of the complex electric field of the optical signal. The scales of the drawings are normalized for each drawing. Each of the white arrows indicates an example of a temporal trajectory of the complex amplitude of the light that is output from each of the first arm 11 or the second arm 12 of the optical modulator 100. Narrow arrows indicate examples of coordinates of the light output from those arms at a certain time, and a bold arrow indicates an example of a trajectory of the complex amplitude of the optical signal acquired by coupling the light at the optical coupler 22 (in other words, the optical modulation signal 15).

FIG. 15 illustrates a case in which the pre-chirping is not applied to the optical modulation signal 15. An arc A1 is associated with the light output from the first arm 11, and an arc A2 is associated with the light output from the second arm 12. In FIG. 15, in this case, the pre-chirping is not applied to the optical modulation signal 15. Thus, both the arc A1 and the arc A2 are on the same circular path, and the circular angles formed thereby with the origin are the same. As a result, a trajectory A3 of the complex electric field of the optical modulation signal 15 is on the actual number axis.

FIG. 16 illustrates a case in which the pre-chirping is applied to the optical modulation signal 15 by the general procedure. At the first arm 11 and the second arm, the phase difference is applied between the light output from the first arm 11 and the light output from the second arm 12. In FIG. 16, the phase difference ratio (phase ratio) is 0.2:0.8, which is similar to those in FIG. 7 to FIG. 10. Further, the coupling ratio of the optical coupler 22 is 0.5:0.5, and hence both an arc B1 and the arc B2 are on the same circular path. However, due to the phase difference applied at the first arm and the second arm, the circular angle formed by the arc B1 with the origin and the circular angle formed by the arc B2 with the origin are different from each other. As a result, a trajectory B3 of the optical modulation signal 15, which is indicated with the bold arrow, has an arc. In other words, the phase difference for applying the pre-chirping is generated at the first arm 11 and the second arm 12, and hence the trajectory B3 has a convex shape protruding in the virtual number axis direction (in other words, the phase difference is imparted by an imaginary number component), as illustrated in FIG. 16.

FIG. 17 illustrates a case in which the pre-chirping is applied to the optical modulation signal 15 by the procedure of changing a coupling ratio. FIG. 17 illustrates the pre-chirping in a case in which the coupling ratio of the optical coupler 22 is 0.7:0.3. The coupling ratio of the optical coupler 22 is 0.7:0.3, and hence an amplitude of a trajectory C2 is 3/7 of that of a trajectory C1. As a result, in FIG. 17, the distance of the trajectory C1 from the origin and the distance of the trajectory C2 from the origin are different from each other. Meanwhile, in a case of FIG. 17, the phase difference for the pre-chirping is not applied at the first arm 11 and the second arm 12. Thus, the circular angles formed by the trajectory C1 and the trajectory C2 with the origin are equal to each other. However, a trajectory C3 acquired by combining the trajectory C1 and the trajectory C2 with each other is provided with the phase difference imparted by an imaginary number component, which is different from FIG. 15. In other words, when the coupling ratio of the optical coupler 22 is a value different from 0.5:0.5, the pre-chirping can be applied to the optical modulation signal 15 that is output from the optical coupler 22, without performing control for applying the pre-chirping at the first and second arms 11 and 12.

In this manner, in the optical modulator 100, the coupling ratio of the optical coupler 22 is a value different from 0.5:0.5. With this, in the optical modulator 100, the pre-chirping can be applied to the optical modulation signal 15 that is output from the optical coupler 22, with a simple configuration, without providing the first arm 11 and the second arm 12 with the function of applying the phase difference for the pre-chirping. The reason for this is that the coupling ratio of the optical coupler 22 is a value different from 0.5:0.5, the phase difference is generated at the optical modulation signal 15 in the optical coupler 22, and thus the pre-chirping can be applied to the optical modulation signal 15. Further, the optical modulator 100 does not require a circuit for controlling a voltage applied to the first arm 11 and the second arm 12 and applying pre-chirping. In other words, the optical modulator 100 exerts an effect of applying pre-chirping to an optical modulation signal with a simple configuration.

In particular, due to the material characteristic of the silicon optical modulator, it may be difficult to apply the pre-chirping to the optical modulation signal 15 by controlling a voltage applied to the first arm 11 and the second arm 12. However, when the configuration of the optical modulator 100 is applied to the silicon optical modulator, the pre-chirping can be applied to the optical modulation signal 15 with a simple configuration while reducing a size of the optical modulator 100. Further, the optical modulator 100 according to the present example embodiment is a silicon optical modulator smaller than an LN optical modulator, and hence an effect of reducing a size of the optical transmitter 10 can be exerted, and an effect of improving transmission quality of the optical modulation signal 15 transmitted in the optical transmission system 1 can also be exerted.

The coupling ratio of the optical coupler 22 may be set by simulation or actual measurement in such a way that transmission quality of the optical modulation signal 15 received by the optical receiver 20 or the reception data 25 satisfies a requirement of the optical transmission system 1. For example, indicators of transmission quality include information such as a signal-to-noise ratio (SNR) of the optical modulation signal 15, an error rate of the transmission data demodulated from the optical modulation signal 15, and an opening rate of an eye pattern, and are not limited thereto. Further, the coupling ratio of the optical coupler 22 may be a constant value, or an optical coupler with a variable coupling ratio may be used in place of the optical coupler 22. Further, one with desired pre-chirping may be selected from a plurality of optical modulators being manufactured, and mounted to the optical transmitter 10.

(Another Expression of Optical Modulator 100)

The optical modulator 100 according to the first example embodiment may be described as follows. In other words, with the reference symbols in FIG. 2 in the parentheses, an optical modulator (100) includes an optical splitter (21), first and second arms (11, 12), and an optical coupler (22). The optical splitter functions as an optical splitting means for splitting input light into two light beams. The first and second arms modulates the two light beams by the transmission data after split by the optical splitter. The optical coupler functions as an optical coupling means for coupling output light from the first arm and output light from the second arm at a predetermined coupling ratio and generating an optical modulation signal. Further, the optical splitter, the first and second arms, and the optical coupler are configured in order to operate as a Mach-Zehnder optical modulator, and a coupling ratio of the optical coupler is set in such a way as to apply predetermined pre-chirping to an optical modulation signal. Further, the coupling ratio of the optical coupler is set in such a way as to apply the predetermined pre-chirping to the optical modulation signal, and hence the optical modulator and an optical modulation method including a procedure similar to the optical modulator are capable of applying the pre-chirping to the optical modulation signal with a simple configuration.

Second Example Embodiment

Figure 18:
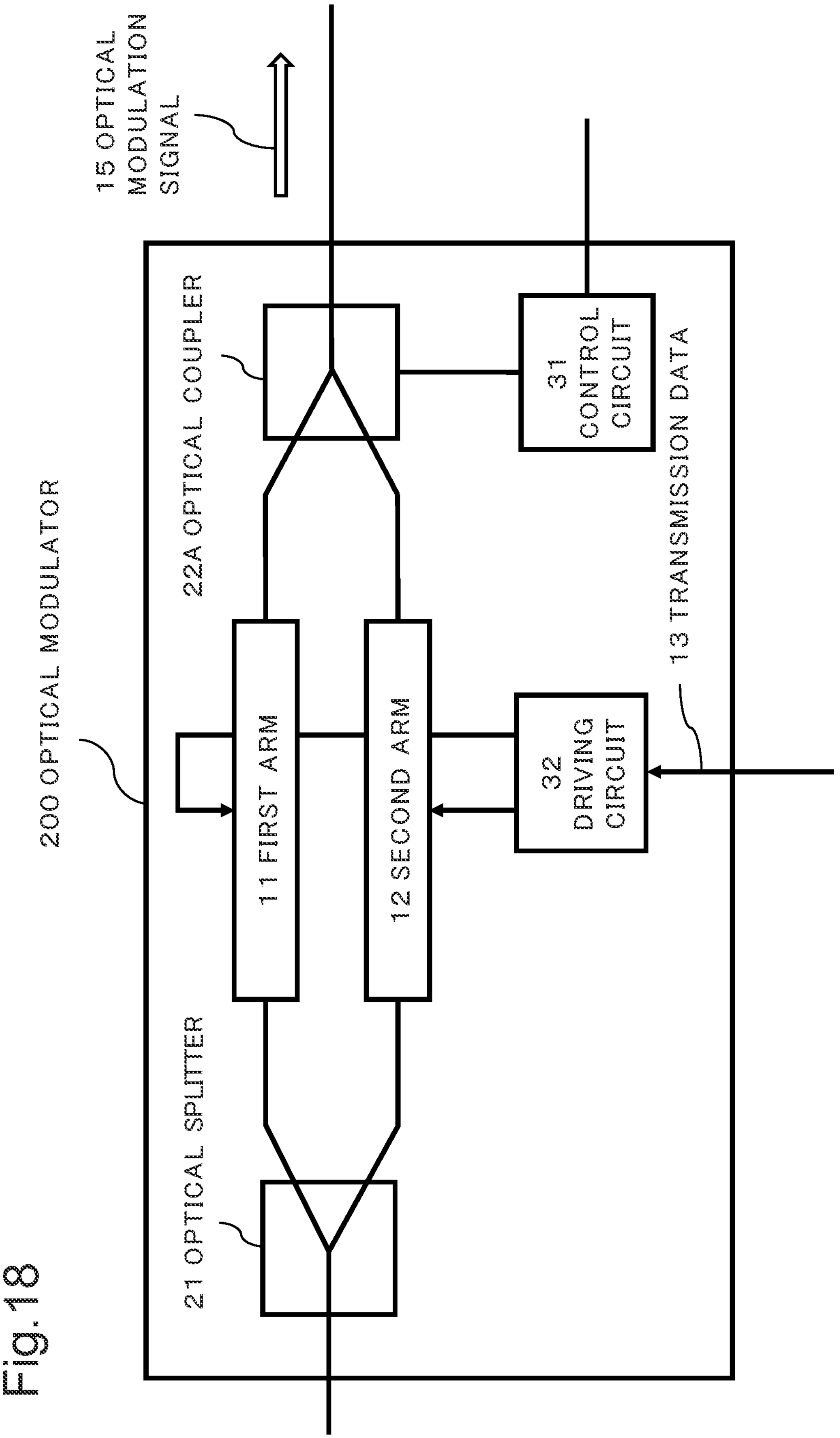
FIG. 18 is a block diagram illustrating a configuration example of an optical modulator according to a second example embodiment.

A case in which an optical coupler 22A with a variable coupling ratio is used in place of the optical coupler 22 is described. FIG. 18 is a block diagram illustrating a configuration example of an optical modulator 200 according to the second example embodiment. The optical modulator 200 is a silicon optical modulator. However, the optical modulator 200 is different from the optical modulator 100 in FIG. 2 in that the optical coupler 22A and a control circuit 31 are provided. The optical coupler 22A is an optical coupler whose coupling ratio can be set under control of the control circuit 31, and is used in place of the optical coupler 22 of the optical modulator 100. A technique of configuring the optical coupler 22A with a variable coupling ratio by the control circuit 31 and an optical waveguide path has been known.

The control circuit 31 is an electric circuit, and controls a coupling ratio of the optical coupler 22A, based on data received from the outside of the optical modulator 200. For example, when data indicating a value of the coupling ratio is received, the control circuit 31 controls the coupling ratio of the optical coupler 22A in such a way that the coupling ratio matches with the value.

In addition to the effects of the optical modulator 100 according to the first example embodiment, the optical modulator 200 thus configured exerts an effect of changing the pre-chirping applied to the optical modulation signal 15 as required because the coupling ratio of the optical coupler 22A can be changed. For example, even when the configuration of the optical transmission path 30 is changed, and dispersion thereof is also changed, degradation of transmission quality of the optical modulation signal 15 received by the optical receiver 20 can be suppressed by transmitting the data indicating the coupling ratio to the control circuit 31.

Further, the control circuit 31 may be notified of a control parameter associated with the coupling ratio of the optical coupler 22A (for example, a voltage for controlling the coupling ratio) instead of the coupling ratio. In this case, the control circuit 31 controls the coupling ratio of the optical coupler 22A, based on the control parameter being notified. A relationship between the control parameter and the coupling ratio may be acquired by actual measurement at the time of shipping of the optical modulator 200, for example.

(First Modification Example of Second Example Embodiment)

Figure 19:
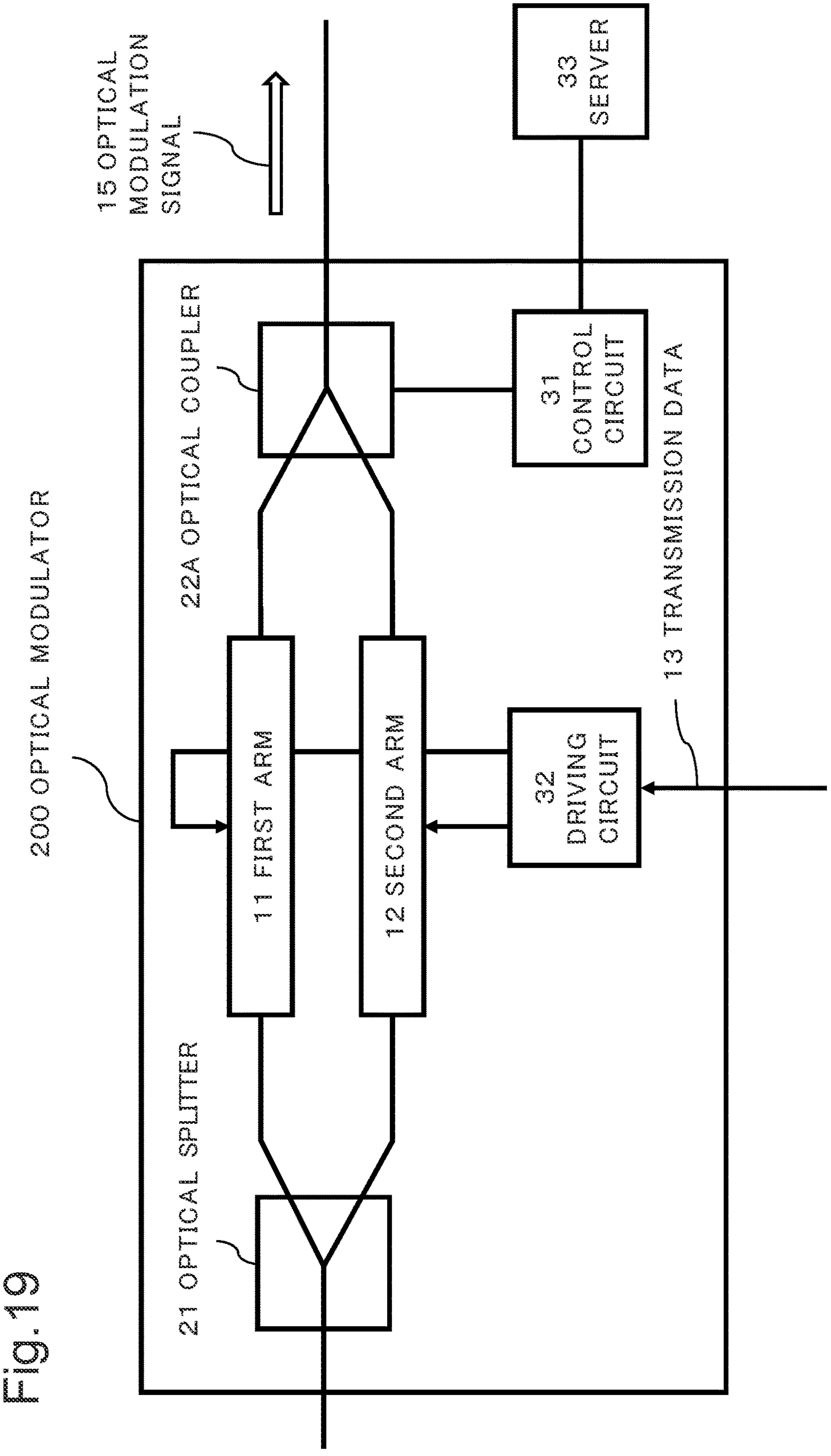
FIG. 19 is a diagram illustrating a first modification example of the second example embodiment.

FIG. 19 is a diagram illustrating a first modification example of the second example embodiment. A server 33 is connected to the outside of the optical modulator 200. The server 33 stores a table indicating a relationship between a dispersion value of the optical transmission path 30 and the coupling ratio of the optical coupler 22A or the control parameter that is associated with the dispersion value. For example, the coupling ratio or the control parameter is stored in the table, and both of them are set in such a way as to suppress degradation of quality of the optical modulation signal 15 due to dispersion. The server 33 is connected to the control circuit 31. When a maintenance worker inputs a dispersion value to the server 33, the server 33 retrieves the table, and the control circuit 31 is notified of the coupling ratio of the optical coupler 22A or the control parameter that is associated with the dispersion value being input. For example, the data stored in the table may be acquired at the time of shipping of the optical modulator 200 by actually measuring a dispersion amount, and the coupling ratio of the optical coupler 22A or the control parameter for applying preferred pre-chirping associated with the dispersion amount.

The server 33 described above may be referred to as a storage device that stores the coupling ratio associated with dispersion of the optical transmission path 30 and notifies the control circuit 31 of the splitting ratio being stored. The function of the server 33 may be provided as the function of the optical transmitter 10 or the function of the optical modulator 100 in FIG. 1.

When dispersion of the optical transmission path 30 is changed, a maintenance worker inputs a new dispersion value to the server 33. The server 33 notifies the control circuit 31 of a coupling ratio or a parameter that is associated with the dispersion value being input, as data. The control circuit 31 changes the coupling ratio of the optical coupler 22A, based on the data being notified. As a result, the present modification example further exerts an effect of applying pre-chirping associated with a dispersion change to an optical modulation signal.

(Second Modification Example of Second Example Embodiment)

Figure 20:
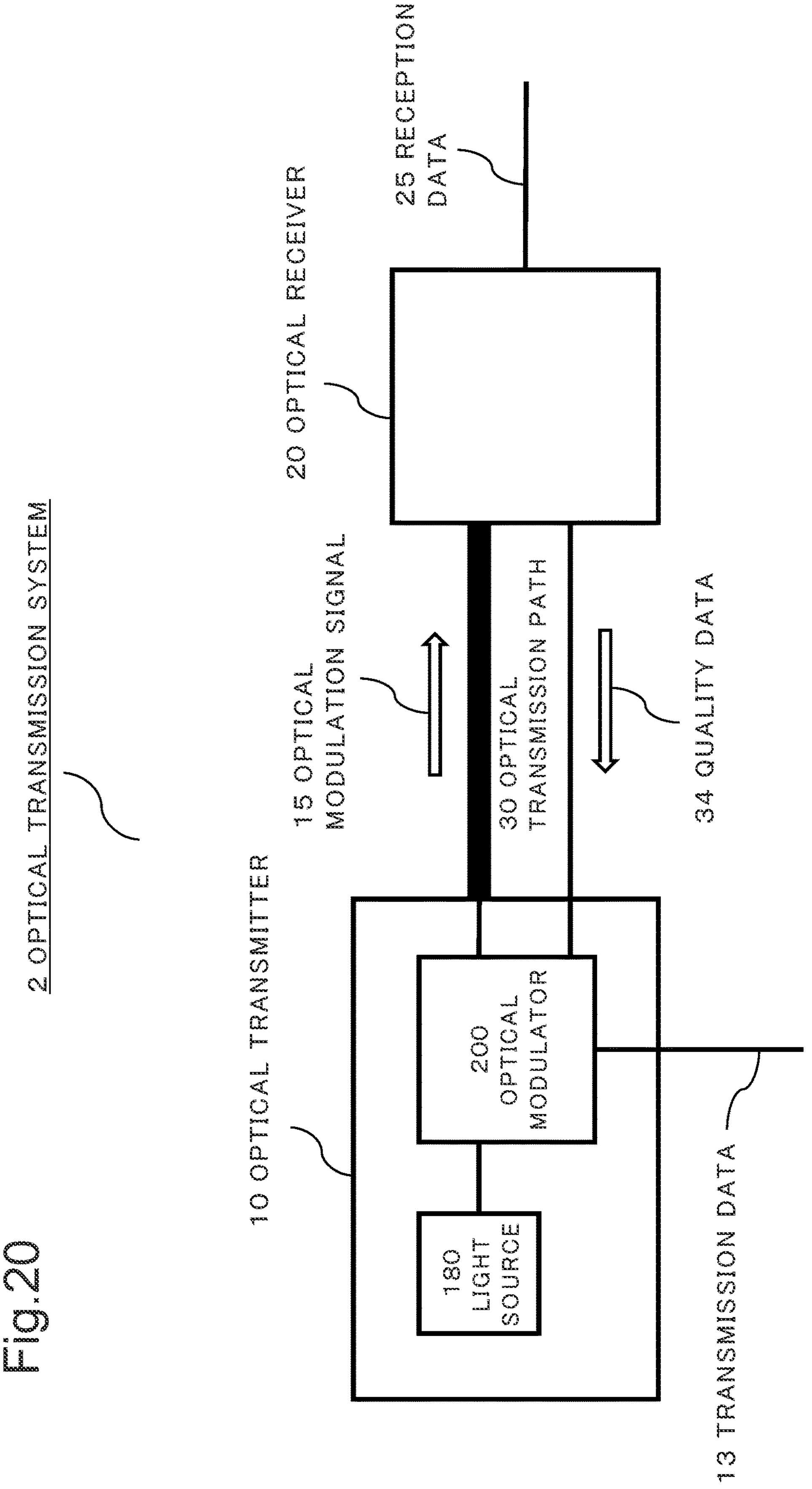
FIG. 20 is a diagram illustrating a second modification example of the second example embodiment.

FIG. 20 is a diagram illustrating a second modification example pf the second example embodiment. In an optical transmission system 2 illustrated in FIG. 20, the optical receiver 20 notifies the optical modulator 200 of quality data 34 indicating transmission quality of the reception data 25 at a predetermined frequency. The optical modulator 200 controls the coupling ratio of the optical coupler 22A, based on the quality data 34 being notified. The control circuit 31 is capable of controlling the coupling ratio of the optical coupler 22A, based on the quality data 34. For example, the quality data 34 includes data indicating a signal-to-noise ratio (SNR) of the optical modulation signal 15, an error rate of the transmission data demodulated from the optical modulation signal 15, and an opening rate of an eye pattern, and is not limited thereto. For example, when the quality data 34 notified from the optical receiver 20 is an error rate of the transmission data, the optical transmitter 10 monitors an error rate notified from the optical receiver 20, and controls the coupling ratio of the optical coupler 22A in such a way as to reduce the error rate.

A data format of the quality data 34 or a notification path thereof from the optical receiver 20 are not particularly limited. For example, the optical receiver 20 may notify the optical transmitter 10 of the quality data 34 by using a maintenance line that enables communication with the optical transmitter 10. Alternatively, another optical transmitter arranged in the vicinity of the optical receiver 20 may transmit the quality data 34 by using the optical transmission path 30. In this case, another optical receiver arranged in the vicinity of the optical transmitter 10 may receive the quality data 34, and may notify the optical transmitter 10 of the quality data 34. The quality data 34 is transferred to the control circuit 31 inside the optical transmitter 10.

Even when dispersion of the optical transmission path 30 is changed, the optical transmission system 2 according to the present example embodiment exerts an effect of applying chirping to the optical modulation signal 15 in such a way as to suppress degradation of transmission quality without intervention of a maintenance worker.

Third Example Embodiment

Figure 21:
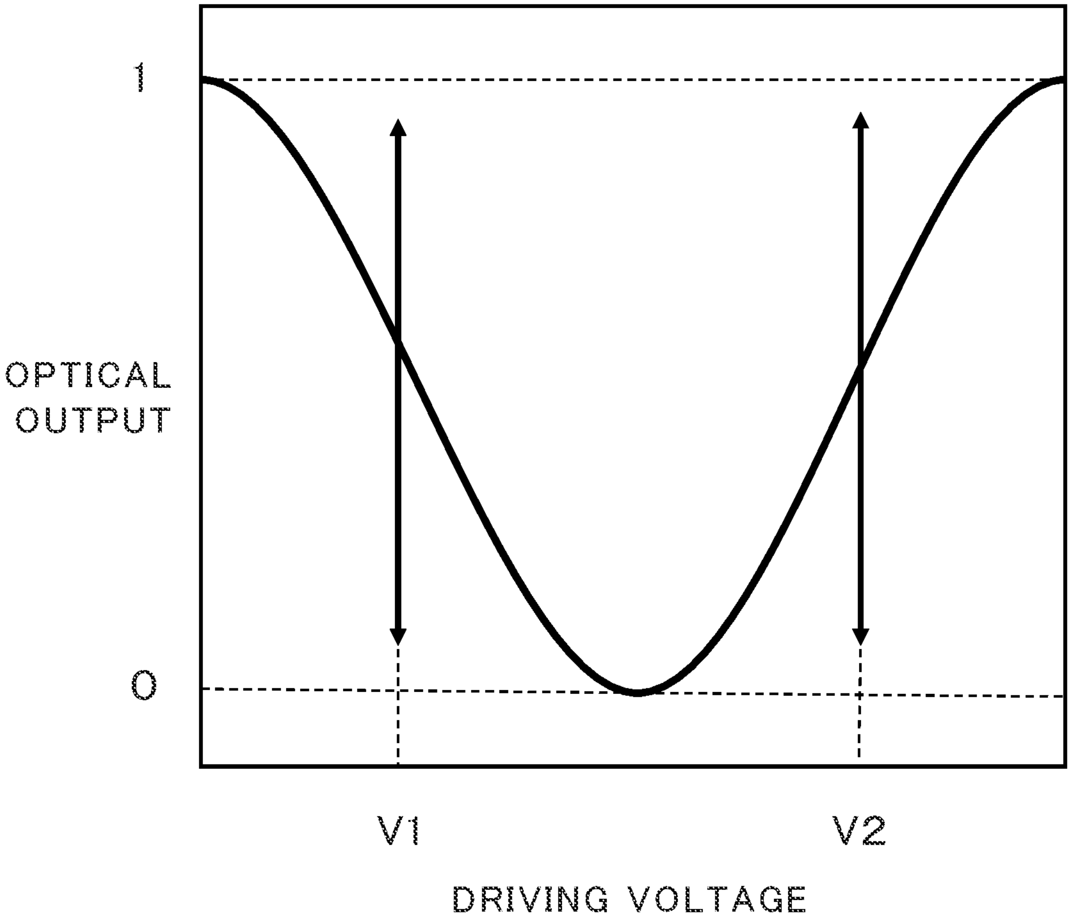
FIG. 21 is a diagram illustrating an example of optical output characteristics with respect to a driving voltage in the optical modulator.

FIG. 21 is a diagram illustrating an example of optical output characteristics with respect to a driving voltage of the first arm 11 and the second arm 12 in the optical modulators 100 and 200 described in the first and the second example embodiment (hereinafter, collectively referred to as the "optical modulator 100" in the present example embodiment). The horizontal axis indicates a driving voltage, and the vertical axis indicates an optical output. In general, the optical output characteristics of the MZ optical modulator indicates a periodical change. While V1 or V2 in FIG. 21 is regarded as a bias voltage applied to the first arm 11 and the second arm 12, the optical modulator 100 modulates the continuous light by superimposing an amplitude of the transmission data with the voltage as a center. V1 is a bias voltage that is set to a region with the characteristics of a downward slope in FIG. 21 (hereinafter, referred to as a "V1 region"), and V2 is a bias voltage that is set to a region with the characteristics of an upward slope (hereinafter, referred to as a "V2 region"). The bias voltage is preferably set to a voltage that the optical output amplitude, which is indicated with an arrow in both directions in FIG. 21, as large as possible.

Figure 22:
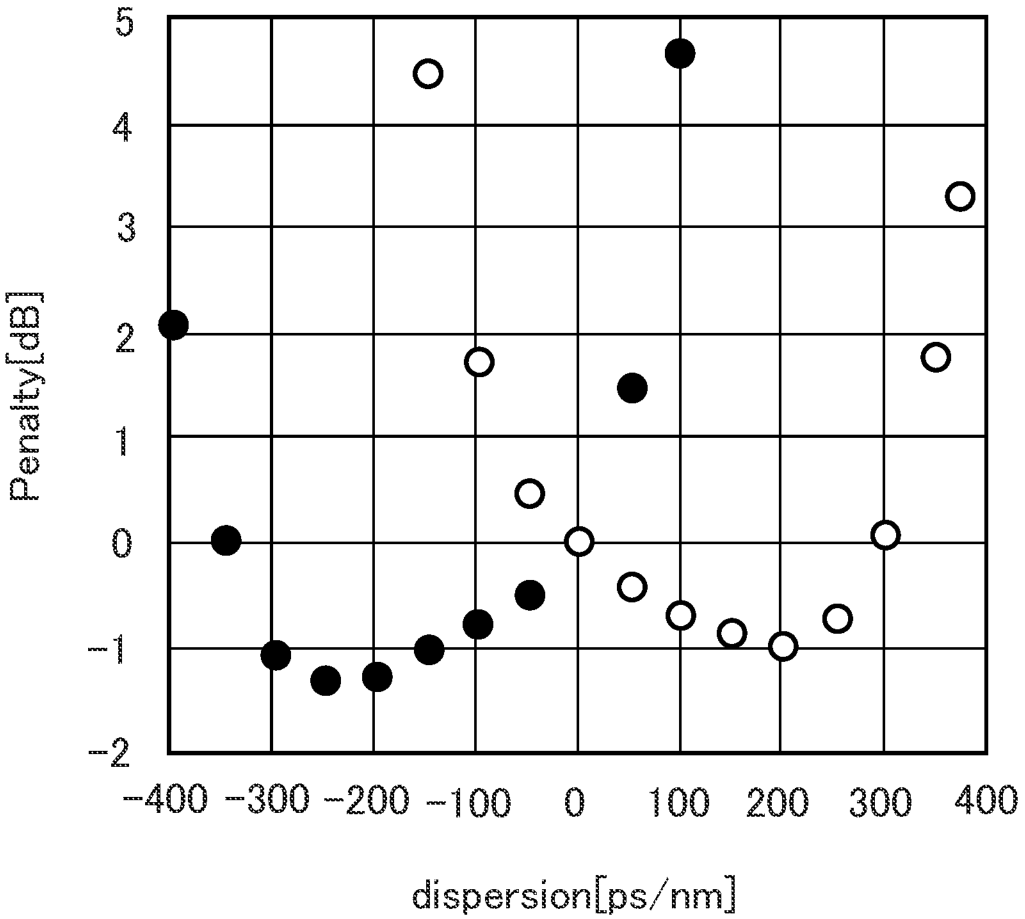
FIG. 22 is a diagram illustrating a characteristic example of dispersion tolerance of an optical modulation signal.

FIG. 22 is a diagram illustrating a characteristic example of dispersion tolerance of the optical modulation signal 15. The horizontal axis indicates a dispersion value, and the vertical axis indicates a power penalty in the optical receiver 20. A smaller value of the power penalty (a lower region in FIG. 22) is more preferred. A white circle indicates a characteristic example when positive dispersion tolerance of the optical modulation signal 15 is high, and a black circle indicates a case in which the positive dispersion tolerance of the optical modulation signal 15 is lower than the characteristics indicated by the white circle. A general single mode fiber has positive dispersion, and hence the optical modulator 100 is preferably used under a condition for the optical modulation signal 15 to have the highest positive dispersion tolerance as possible.

Herein, when the optical modulation signal 15 has the dispersion tolerance indicated by the black circle in FIG. 22, the dispersion tolerance characteristics of the optical modulation signal 15 can be close to the characteristics indicated by the white circle by switching the region of the bias voltage of the optical modulator 100 between the V1 region and the V2 region. For example, in a case in which the transmission characteristics of the optical modulation signal 15 are measured, and the dispersion tolerance indicated by the black circle is consequently detected, when the bias voltage of the optical modulator 100 is in the V1 region, the bias voltage may be changed to the V2 region. Alternatively, when the bias voltage of the optical modulator 100 is in the V2 region, the bias voltage may be changed to the V1 region. The dispersion tolerance characteristics of the optical modulation signal 15 can be close to the white circle by changing the region of the bias voltage as described above.

However, when the region of the bias voltage is changed across the peak of the optical output characteristics as described above, the sign of the transmission data included in the optical modulation signal 15 is inverted. Thus, when the region of the bias voltage is changed from V1 to V2 or from V2 to V1, the logic of the data may be inverted in the driving circuit 32 illustrated in FIG. 2 and the like. Such inversion of the logic of the data can prevent inversion of the logic of the transmission data included in the optical modulation signal 15, which is caused by changing the region of the bias voltage.

The dispersion tolerance characteristics illustrated in FIG. 22 may be acquired by dispersing the optical modulation signal 15 after manufacturing the optical modulator 100 and actually measuring a relationship between the dispersion and the power penalty. Alternatively, the dispersion tolerance characteristics may be grasped by using a parameter indicating a coefficient when a temporal change of a phase is caused in proportional to a temporal change of intensity (hereinafter, referred to as an "α parameter"). The α parameter is a parameter relating to fluctuation of a wavelength λ at the time of modulating optical intensity I, and is expressed by $d\lambda=(1/2)\times\alpha\times(dI/dt)$. Further, the α parameter being positive, which is measured by operating the optical modulator 100, indicates low positive dispersion tolerance of the optical modulation signal 15, and hence the region of the bias voltage may be changed (from the V1 region to the V2 region, or from the V2 region to the V1 region). With this, the positive dispersion tolerance of the optical modulation signal 15 can be improved. Further, when the α parameter is negative, the region of the bias voltage may not be changed.

Figure 23:
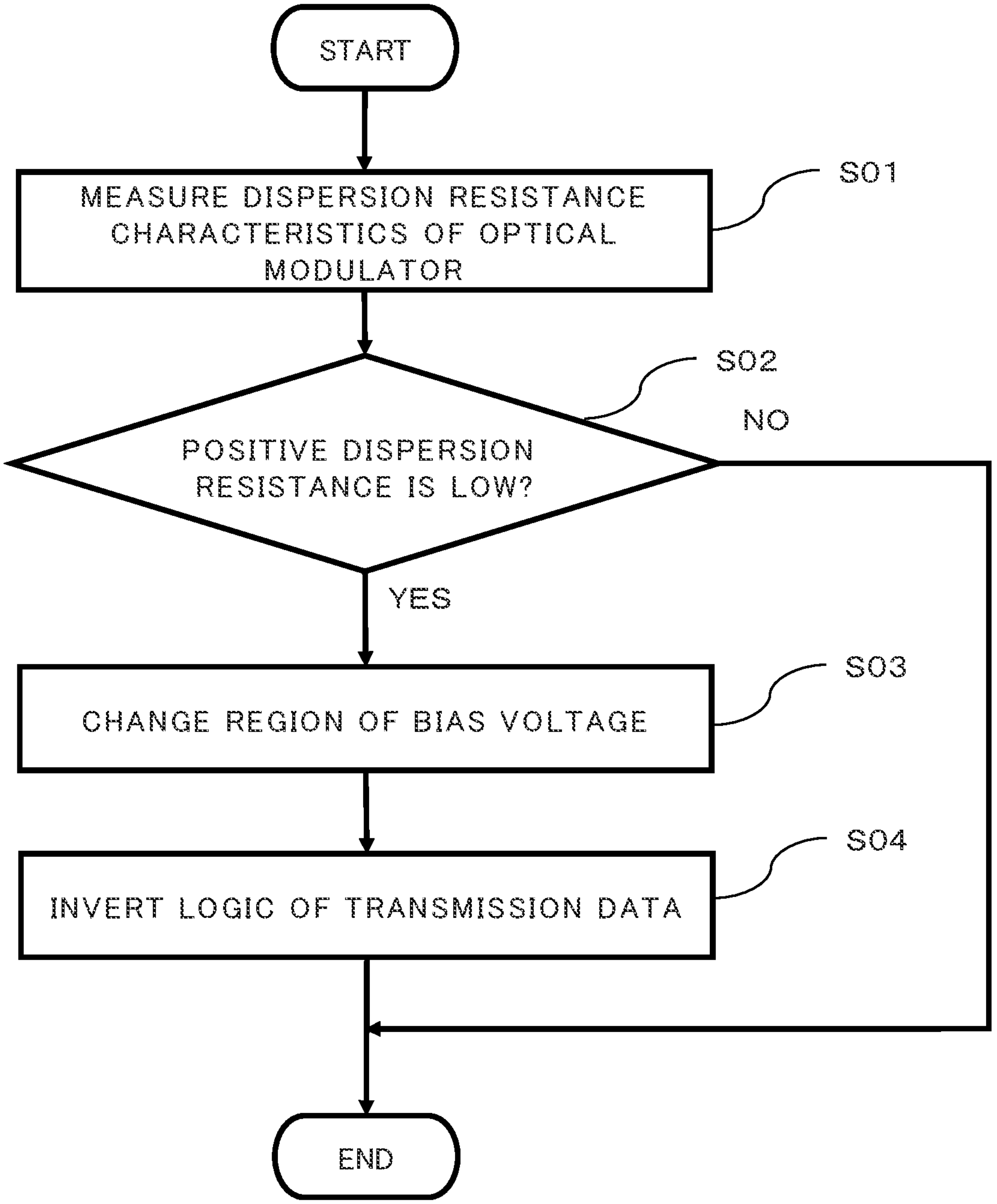
FIG. 23 is a flowchart illustrating an example of a procedure of setting a region of a bias voltage.
Figure 24:
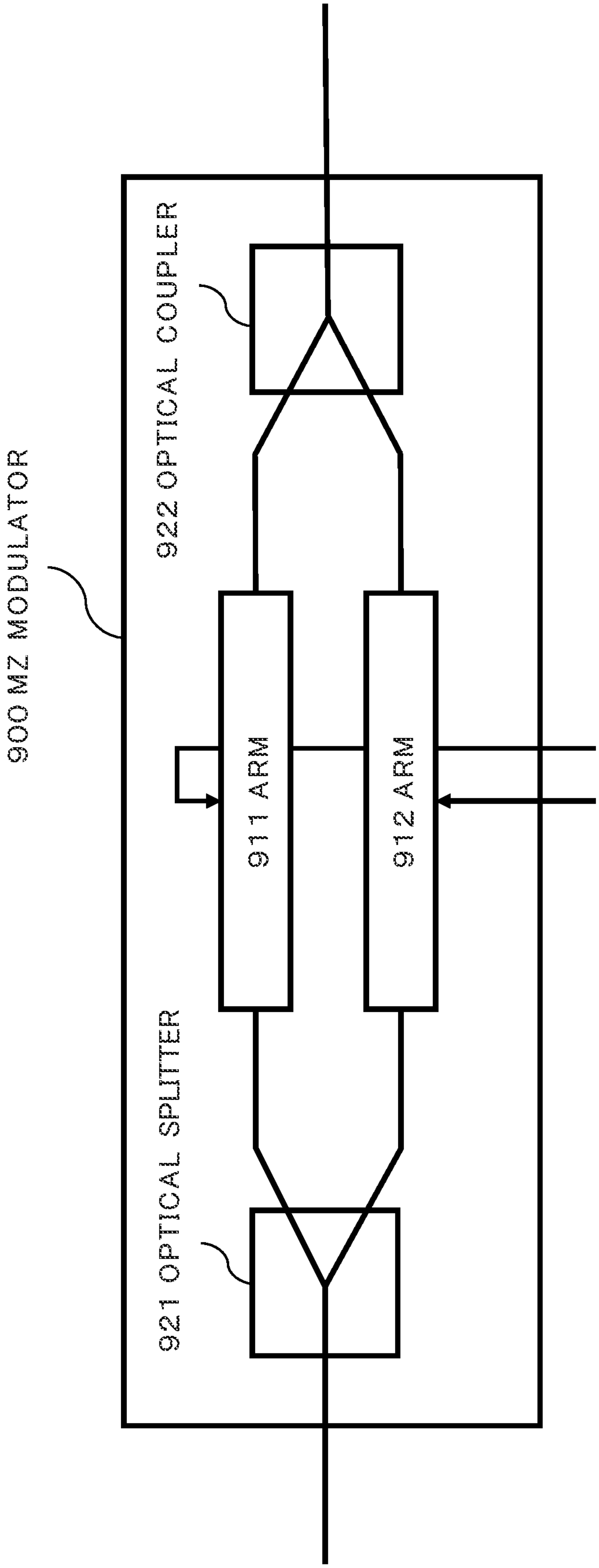
FIG. 24 is a diagram illustrating a configuration of a general MZ optical modulator.

FIG. 23 is a flowchart illustrating an example of a procedure of setting the region of the bias voltage in the present example embodiment. First, the dispersion tolerance characteristics of the optical modulator 100 are measured (step S01 in FIG. 23). When the positive dispersion tolerance is low (for example, the characteristics indicated by the black circle in FIG. 22) (step S02: YES), the region of the bias voltage is changed (step S03), and the logic of the transmission data is also inverted (step S04). As described above, the region of the bias voltage can be changed through the change from the V1 region to the V2 region or the change from the V2 region to the V1 region.

The procedure in the present example embodiment is an example of a procedure of selecting the bias voltage applied to the first arm 11 and the second arm 12 in such a way as to provide the optical modulation signal 15 with higher positive dispersion tolerance. The optical modulation signal 15 can be provided with more desirable dispersion tolerance by setting the bias voltage of the optical modulator 100 according to the characteristics of the optical modulation signal 15.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, in each of the example embodiments, the coupling ratio of the optical couplers 22 and 22A is set in such a way as to apply the predetermined pre-chirping to the optical modulation signal 15. However, the splitting ratio of the optical splitter 21 may be set in such a way as to apply the predetermined pre-chirping to the optical modulation signal 15. Further, the procedure of setting the coupling ratio of the optical couplers 22 and 22A described in each of the example embodiments is applicable to a procedure of setting the splitting ratio of the optical splitter 21. By setting the splitting ratio of the optical splitter 21 by the procedure, an effect similar to that in a case of setting the coupling ratio of the optical couplers 22 and 22A can be exerted.

REFERENCE SIGNS LIST

1, 2 Optical transmission system
10 Optical transmitter
11 First arm
12 Second arm
13 Transmission data
15 Optical modulation signal
20 Optical receiver
21 Optical splitter
22, 22A Optical coupler
25 Reception data
30 Optical transmission path
31 Control circuit
32 Driving circuit
33 Server
34 Quality data
100, 200 Optical modulator
180 Light source
900 MZ optical modulator
911, 912 Arm
921 Optical splitter
922 Optical coupler

What is claimed is:

1. An optical transmission system comprising:

an optical transmitter including an optical modulator, the optical modulator being configured to output an optical modulation signal to an optical transmission path; and an optical receiver configured to receive the optical modulation signal from the optical transmission path, wherein the optical modulator includes:

an optical splitter configured to split input light into two light beams;

a first arm and a second arm that are configured to modulate the two light beams by transmission data after split by the optical splitter;

an optical coupler configured to couple output light from the first arm and output light from the second arm at a predetermined coupling ratio and generating an optical modulation signal; and a control circuit configured to set the coupling ratio, wherein the optical splitter, the first arm and the second arm, and the optical coupler are configured to operate as a Mach-Zehnder optical modulator, the coupling ratio is set in such a way as to apply predetermined pre-chirping to the optical modulation signal, the predetermined pre-chirping is applied in such a way that the optical modulation signal includes predetermined transmission quality, and the control circuit controls the coupling ratio in such a way as to improve the predetermined transmission quality, and the optical receiver notifies the control circuit, as the predetermined transmission quality, of information indicating transmission quality of the transmission data demodulated from the optical modulation signal.

2. The optical transmission system according to claim 1, wherein the optical modulator is a silicon optical modulator including an optical waveguide path formed of silicon as a material.

3. The optical transmission system according to claim 1, wherein the coupling ratio is set to 0.6:0.4, 0.9:0.1, or a value in between.

4. The optical transmission system according to claim 1, wherein a bias voltage of the first arm and the second arm is selected in such a way that the optical modulation signal has higher positive dispersion tolerance.

5. A control method for an optical transmission system, the control method comprising:

outputting, by an optical modulator included in an optical transmitter, an optical modulation signal to an optical transmission path; and receiving, by an optical receiver, the optical modulation signal from the optical transmission path, wherein the optical modulator includes:

an optical splitter configured to split input light into two light beams;

a first arm and a second arm that are configured to modulate the two light beams by transmission data after split by the optical splitter;

an optical coupler configured to couple output light from the first arm and output light from the second arm at a predetermined coupling ratio and generating an optical modulation signal; and a control circuit configured to set the coupling ratio, wherein the optical splitter, the first arm and the second arm, and the optical coupler are configured to operate as a Mach-Zehnder optical modulator, the coupling ratio is set in such a way as to apply predetermined pre-chirping to the optical modulation signal, the predetermined pre-chirping is applied in such a way that the optical modulation signal includes predetermined transmission quality, and the control circuit controls the coupling ratio in such a way as to improve the predetermined transmission quality, and the control method further comprising:

notifying, by the optical receiver, the control circuit, as the predetermined transmission quality, of information indicating transmission quality of the transmission data demodulated from the optical modulation signal.

* * * * *